May 4, 1965
A. SKOK
3,181,239
TREE AND SHRUB BRANCH SAW
Filed Oct. 4, 1963
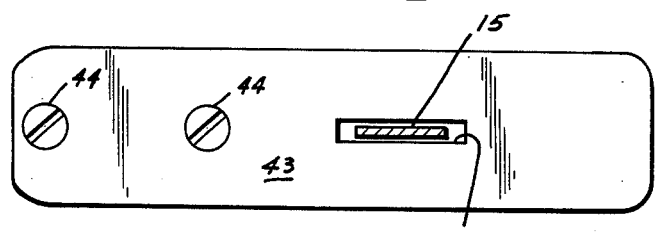
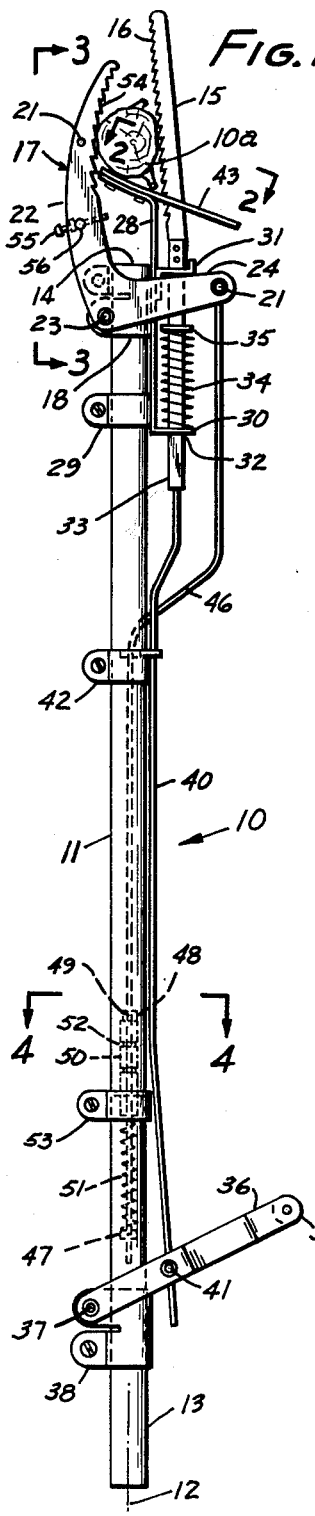
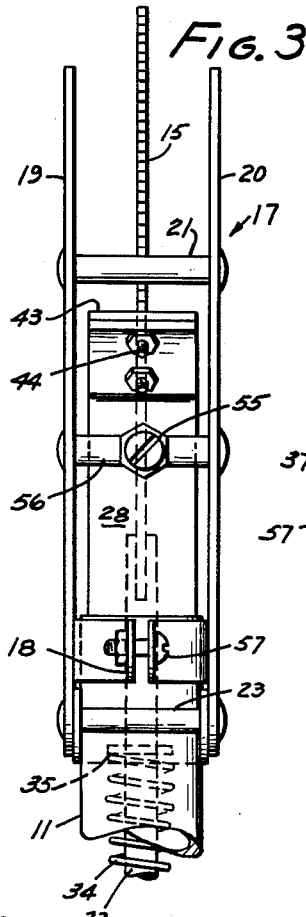
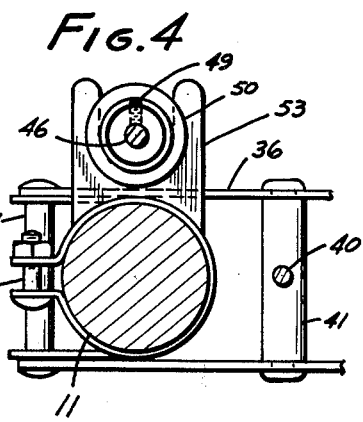
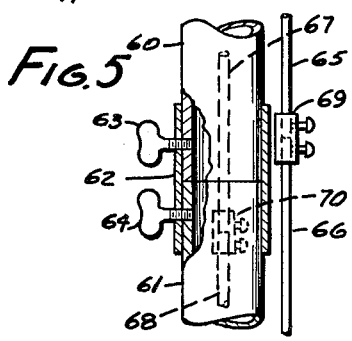
INVENTOR.
ALOIS SKOK
BY Angus & Mon
ATTORNEYS.

3,181,239
TREE AND SHRUB BRANCH SAW
Alois Skok, 679 S. Mentor Ave., Pasadena, Calif.
Filed Oct. 4, 1963, Ser. No. 314,014
3 Claims. (Cl. 30—166)

This invention relates to saws and more particularly to saws for cutting tree and shrub branches, and has for an object to provide such a saw easily operable from the ground to make a clean cut through the branch.

A related object of this invention is to provide a means which will not loosen its grip on the branch as the saw cuts through the branch.

A further object of this invention is to provide a saw operable by a mechanism having a mechanical advantage to decrease the force exerted by the operator to cut the branch.

It is desirable when cutting tree and shrub branches to cut them smoothly so that there will be no jagged edges remaining on the tree. When a tree branch is cut using an ordinary saw attached to a long extension pole, as used heretofore, it is easy for the saw to slip or change its course through the branch during the cutting operation. As a result, there will not be a clean, smooth cut of the branch and it is likely that the bark will split from the branch at the cut. It is difficult to seal the wood exposed by a jagged cut and easy for harmful insects to eat into the tree thereby infecting the tree at the cut. The chances of infecting a tree with a disease at a clean cut are for more remote than the chances of infecting a tree at a jagged cut. The use of a knife blade, which has heretofore been a common practice, has the limitation that the blade is capable of cutting only small branches.

This invention provides a means which may be attached to a pole which will grasp the branch firmly on the opposite side of the branch from the saw. A feature resides in the provision of means at the handle for operating the branch grasping means and also the saw.

The foregoing and other features of this invention will be more easily understood in the following detailed description and accompanying drawings of which:

FIG. 1 is a front view of a branch cutting saw in accordance with this invention;

FIG. 2 is a view in cross-section taken at line 2—2 of FIG. 1 with the tree branch removed;

FIG. 3 is a view taken at line 3—3 of FIG. 1;

FIG. 4 is a cross-section view taken at line 4—4 of FIG. 1; and

FIG. 5 is a view, partly in cross-section, of a joint on a sectional pole in accordance with this invention.

FIG. 1 shows a branch cutting saw 10 adapted to cut a tree branch 10a in accordance with this invention. The branch saw comprises a tubular pole 11 disposed along a longitudinal axis 12 and having a handle end 13 and a cutting end 14. A saw blade 15 has cuting teeth 16 disposed to cut a branch on a plane. Saw blade 15 is slidably engaged to the pole at the cutting ends and extends beyond end 14 in substantially the same direction as longitudinal axis 12. A clamp 17 is attached to cutting end 14 of the pole by a mounting bracket 18 and is operable to hold a branch firmly against the saw. Clamp 17 comprises two identically shaped clamping members 19 and 20 spaced from and attached to each other by spacer pins such as pin 21. Members 19 and 20 each have a crescent shaped clamping arm 22 pivoted at one end on a hinge pin 23 and have a lever arm 24 extending away from pin 23 substantially perpendicular to arm 22. Members 19 and 20 are disposed to rotate about pin 23 in planes parallel to the cutting plane of the saw blade on opposite sides thereof and have similar profiles as shown in FIG. 1. By placing the clamping members on opposite sides of the saw blade, there can be no bending movement upon the branch when it is clamped between the clamp and the saw blade. Clamping arm 22 has teeth 54 adapted to grip the branch to be cut. A stop screw 55 is attached to a pin 56 extending between members 19 and 20.

A saw blade guide 28 is welded to bracket 18 and a second bracket 29 which is attached to the pole at a position spaced for bracket 18 toward handle end 13. Guide 28 has two radially extending members 30 and 31 each having a hole of rectangular cross-section such as hole 32 passing through member 30. Saw blade 15 has a shank 33 of rectangular cross-section adapted to slide in holes 32 in members 30 and 31. A saw blade return means such as compression spring 34 is disposed around shank 33 to bear against a spring restraining pin 35 attached to shank 33 and member 30. A lever 36 is pivoted at an end on a pin 37 which is connected to a mounting bracket 38 attached to the handle end of the pole. Lever 36 has a hand grip 39 at the end opposite pin 37. A rod 40 is attached at one end to lever 36 at a lateral member 41 disposed between pin 37 and hand grip 39. Rod 40 extends longitudinally along the pole toward cutting end 14 and is connected to shank 33. The rod passes through a guide member 42 which is attached to the pole and spaced between the saw blade 15 and the lever 36. Movement of lever 36 about pin 37 will result in a longitudinal movement of saw 15 at the cuting end. A bearing plate 43 is attached to saw blade guide 28 by screws 44 and is aligned over the end of the pole at the cutting end in a plane substantially perpendicular to the plane of the saw blade. Plate 43 has a rectangular hole 45 to allow saw blade 15 to pass therethrough. The union of plate 43 and saw blade 15 serve as a wedge to bear against the branch.

A rod 46 is connected at one end to lever arm 24 of clamp 17 at the end opposite pin 23 and extends longitudinally toward a clamp control means at the handle end 13. The clamp control means comprises a restraining sleeve 47 attached to rod 46 adjacent the end opposite lever arm 24. A second restraining sleeve 48 is attached to rod 46 at a distance from sleeve 47 toward lever arm 24. Sleeves 47 and 48 are adjustable on rod 46 and may be set at any desired position by set screws 49.

A spool 50 has a longitudinally extending hole passing lengthwise therethrough to be slideably engaged to rod 46 between restraining sleeves 47 and 48. A compression spring 51 is disposed around rod 46 to bear against spool 50 and sleeve 47. Spool 50 has grooves 52 which extend around the circumference of the spool and are spaced from each other along the length of the spool. Grooves 52 are adapted to engage a forked restraining member 53 (shown in FIG. 4) attached to pole 11 in the vicinity between sleeves 47 and 48.

To make use of the device, the operator engages one of the grooves 52 of spool 50 onto forked member 53, and is thus able to provide a compressive force through the spring to bear upon the restraining member 47. This force will tend to pull rod 46 toward the handle end 13 thereby pivoting clamp 17 about pin 23 in a clockwise manner as viewed in FIG. 1. The teeth 54 will then grasp the branch and force it into the wedge formed by plate 43 and saw blade 15.

The teeth 16 of saw blade 15 are disposed to cut into the branch as the lever 36 is rotated in a clockwise direction as shown in FIG. 1; this being the cutting stroke of the saw. When a branch bears against the saw blade in the wedge, the cutting action of the saw blade will force the branch tighter into the wedge, thus forcing the branch tight against the saw blade. After lever 36 is rotated clockwise, it is stopped when spring 34 is completely compressed between member 30 and restraining pin 35.

The operator then relieves some of the pressure exerted on the lever 36 and the lever is forced counterclockwise in a return stroke, which does no cutting, by the compression spring 34 back to its forwardmost position. The lever is thus rotated in this back and forth manner about pin 37 to move the saw blade in a reciprocating movement. The clamp 17 will push the branch towards the saw blade and will rotate slowly clockwise as the branch is cut. The compressive force of the spring on the rod 46 continues to hold clamp 17 against the branch as the saw blade cuts into the branch. After the saw blade cuts a considerable way into the branch, the compressive force of spring 51 on clamp 17 tends to relax and clamp 17 loses its grip on the branch. If it is desired to increase the grip of the clamp on the branch, spool 50 is moved closer towards restraining member 47 and a different groove on the spool may be engaged with forked member 51. Thus the compressive force on rod 46 is again increased to the desired gripping action and the branch may be continued to be cut. As clamp 17 rotates clockwise, the end of stop screw 55 will abut against member 28 when the branch is cut through and the clamp will be restricted from rotating any further.

A mechanical advantage is achieved by positioning the connecting point 41 of the rod 40 on lever 36 between its pivot point 37 and hand grip 39. Less force is applied to the hand grip of the lever than is exerted on the branch by the saw blade.

All of the mounting brackets and guide members are adjustable on pole 11 to any desired position. FIGS. 3 and 4 show mounting bracket 18 and forked restraining member 53 respectively as having a nut and bolt combination 57 to tighten the two resilient ends of the members around the pole 11 after the member is properly positioned.

It should be understood that the pole and control rods for the clamp and saw blade may be constructed in sections and put together to make a pole having a desired length to reach the top of a tree. FIG. 5 shows a typical connection of two pole sections 60 and 61 which may be joined together at their abutting ends. An outer sleeve 62 having an inside diameter substantially the same as the outside diameter of the sections envelopes the abutting ends and thumb screws 63 and 64 passing through the sleeve 62 into the wall of sections 60 and 61 respectively, to rigidly attach each of the pole sections to the sleeve. Similarly, rod sections 65 and 66 having the same function as rod 40, and rod sections 67 and 68 having the same function as rod 46 are each joined in a similar manner by connectors 69 and 70.

This invention is not to be limited to the specific embodiment shown and illustrated herein, which is given by way of illustration rather than of limitation; and the invention is not limited except by the scope of the appended claims.

What is claimed is:

1. A saw for cutting a branch comprising a pole, a saw blade guide attached thereto adjacent an end thereof, a saw blade reciprocable in said guide and having cutting teeth for cutting the branch, clamping means movably attached to the pole adjacent said end and movable toward the cutting teeth to engage the branch at a position remote from the position of engagement of the saw teeth at said branch, bearing means fixed to the pole adjacent said end and in the vicinity of the saw blade and the clamping means and disposed transverse to the direction of reciprocation of the saw blade, a clamping control means attached to the pole, means connecting said clamping control means to the clamping means to move said clamping means in the direction to engage the branch and wedge it between the clamping means, the saw teeth and the bearing means at respective spaced positions around the circumference of the branch, and saw operating means connected with the saw blade to reciprocate the saw blade to cut the branch.

2. A saw according to claim 1 in which the clamping means comprises an arm pivotally mounted relative to the pole and the bearing means comprises a plate located below the points of contact of the saw teeth and of the clamp with the branch.

3. A saw according to claim 2 in which a spring operated retracting means is attached to the saw operating means to move the saw in the retracting direction after each cutting stroke of the saw.

References Cited by the Examiner
UNITED STATES PATENTS

| 1,224,194 | 5/17 | Miller | 30—166 |
| 1,555,847 | 10/25 | Hudson | 287—118 |
| 2,273,329 | 2/42 | Potter | 30—166 |
| 2,322,803 | 6/43 | Koch | 287—118 X |

FOREIGN PATENTS

| 680,109 | 1/30 | France. |
| 790,390 | 9/35 | France. |

WILLIAM FELDMAN, *Primary Examiner.*

M. HENSON WOOD, Jr., MILTON S. MEHR, *Examiners.*